US012725561B2

(12) United States Patent
Kwon et al.

(10) Patent No.: US 12,725,561 B2
(45) Date of Patent: Sep. 1, 2026

(54) LIGHT EMITTING DISPLAY DEVICE

(71) Applicant: Samsung Display Co., LTD., Yongin-si (KR)

(72) Inventors: Soon-Gi Kwon, Yongin-si (KR); Min Woo Byun, Yongin-si (KR); Ji-Hyun Ka, Yongin-si (KR); Minjoo Kim, Yongin-si (KR); Seon I Jeong, Yongin-si (KR); Chae Han Hyun, Yongin-si (KR); Sungchan Hwang, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/436,372

(22) Filed: Feb. 8, 2024

(65) Prior Publication Data

US 2024/0282247 A1 Aug. 22, 2024

(30) Foreign Application Priority Data

Feb. 20, 2023 (KR) ........................ 10-2023-0022140

(51) Int. Cl.
*G09G 3/32* (2016.01)
*G09G 3/3233* (2016.01)
*G09G 3/3266* (2016.01)

(52) U.S. Cl.
CPC ....... *G09G 3/32* (2013.01); *G09G 2300/0452* (2013.01); *G09G 2300/0819* (2013.01); *G09G 2300/0852* (2013.01); *G09G 2310/0243* (2013.01); *G09G 2310/08* (2013.01)

(58) Field of Classification Search
None
See application file for complete search history.

(56) References Cited

U.S. PATENT DOCUMENTS

| | | | | |
|---|---|---|---|---|
| 10,373,563 B2 * | 8/2019 | Park | G09G 3/3233 |
| 10,510,301 B2 * | 12/2019 | Na | G09G 3/3258 |
| 10,636,356 B1 * | 4/2020 | Qian | G09G 3/3233 |
| 11,600,232 B2 * | 3/2023 | Hong | G09G 3/3275 |
| 11,741,887 B2 * | 8/2023 | Kim | G09G 3/3241 345/55 |
| 11,830,439 B2 * | 11/2023 | Park | H10K 59/1216 |
| 12,190,828 B2 * | 1/2025 | Yamamoto | G09G 3/3275 |
| 2017/0092199 A1 * | 3/2017 | Park | G09G 3/3258 |

(Continued)

FOREIGN PATENT DOCUMENTS

| | | |
|---|---|---|
| CN | 113270072 | 8/2021 |
| KR | 10-2017-0105683 | 9/2017 |

(Continued)

*Primary Examiner* — Sepehr Azari
(74) *Attorney, Agent, or Firm* — Sughrue Mion, PLLC

(57) ABSTRACT

A light emitting display device includes multiple pixels arranged in multiple pixel rows, a first scan signal generator that provides a first scan signal to the pixels in the pixel rows, a second scan signal generator that provides a second scan signal to the pixels in the pixel rows, a third scan signal generator that provides a third scan signal to the pixels in the pixel rows, and a light emission signal generator that provides a light emission signal to the pixels in the pixel rows. Each of the second scan signal generator, the third scan signal generator, and the light emission signal generator provides a same signal to the pixels in two of the pixel rows.

19 Claims, 12 Drawing Sheets

(56) References Cited

U.S. PATENT DOCUMENTS

| | | | | |
|---|---|---|---|---|
| 2017/0263188 | A1* | 9/2017 | Na | G09G 3/3258 |
| 2021/0027696 | A1* | 1/2021 | Kim | G09G 3/3233 |
| 2021/0118370 | A1* | 4/2021 | Shim | G09G 3/3233 |
| 2021/0335268 | A1* | 10/2021 | Byun | G11C 19/28 |
| 2021/0375212 | A1* | 12/2021 | Kwon | G09G 3/3266 |
| 2022/0139324 | A1* | 5/2022 | Jeong | G09G 3/3266 345/204 |
| 2022/0392985 | A1* | 12/2022 | Song | G09G 3/035 |
| 2024/0169904 | A1* | 5/2024 | Liu | G09G 3/32 |
| 2024/0177664 | A1* | 5/2024 | Wang | G09G 3/3266 |
| 2024/0212555 | A1* | 6/2024 | Moon | G09G 3/3233 |
| 2024/0221650 | A1* | 7/2024 | Son | G09G 3/2007 |
| 2024/0242672 | A1* | 7/2024 | Kim | G09G 3/3233 |
| 2024/0257738 | A1* | 8/2024 | Ha | G09G 3/3233 |

FOREIGN PATENT DOCUMENTS

| | | |
|---|---|---|
| KR | 10-2021-0083620 | 7/2021 |
| KR | 10-2022-0060089 | 5/2022 |

* cited by examiner

LIGHT EMITTING DISPLAY DEVICE

CROSS REFERENCE TO RELATED APPLICATION(S)

This application claims priority to and benefits of Korean Patent Application No. 10-2023-0022140 under 35 U.S.C. § 119, filed on Feb. 20, 2023, in the Korean Intellectual Property Office (KIPO), the entire contents of which are incorporated herein by reference.

BACKGROUND

1. Technical Field

The disclosure relates to a light emitting display device.

2. Description of the Related Art

A display device is a device that displays an image, and includes a liquid crystal display (LCD), an organic light emitting diode (OLED) display, which is a light emitting display device, or the like. Such a display device is used in various electronic devices such as portable phones, navigation devices, digital cameras, electronic books, portable game devices, the like, or various terminals.

A display device such as a light emitting display device may have a structure in which the display device can be bent or folded by using a flexible substrate.

A structure of a pixel used in such a light emitting display devices is being developed in various directions.

SUMMARY

The disclosure provides a light emitting display device that can reduce a non-display area without causing display quality and effectively use a limited area.

According to an embodiment of the disclosure, a light emitting display device may include a plurality of pixels arranged in a plurality of pixel rows, a first scan signal generator that provides a first scan signal to the plurality of pixels in the plurality of pixel rows, a second scan signal generator that provides a second scan signal to the plurality of pixels in the plurality of pixel rows, a third scan signal generator that provides a third scan signal to the plurality of pixels in the plurality of pixel rows, and a light emission signal generator that provides a light emission signal to the plurality of pixel in the plurality of pixel rows. Each of the second scan signal generator, the third scan signal generator, and the light emission signal generator may provide a same signal to the plurality of pixels in two of the plurality of pixel rows.

The first scan signal generator may provide a same first scan signal to the plurality of pixels in each of the plurality of pixel rows.

The first scan signal generator may include a first-first scan signal generator and a first-second scan signal generator, and the first-first scan signal generator and the first-second scan signal generator may be disposed on each side of the plurality of pixels.

The light emission signal generator may include a first light emission signal generator and a second light emission signal generator, and the first light emission signal generator and the second light emission signal generator may be disposed on each side of the plurality of pixels.

Each of the second scan signal generator and the third scan signal generator may be disposed on only a side of the plurality of pixels.

The second scan signal generator may be disposed on a first side of the plurality of pixels, and the third scan signal generator may be disposed on a second side of the plurality of pixels, which faces the first side.

Each of the first scan signal generator and the light emission signal generator may be disposed on only a side of the plurality of pixels.

The first scan signal generator may be disposed on a first side of the plurality of pixels, and the light emission signal generator may be disposed on a second side of the plurality of pixels, which faces the first side.

Each of the second scan signal generator and the third scan signal generator may be disposed on only a side of the plurality of pixels.

The second scan signal generator may be disposed on a first side of the plurality of pixels, and the third scan signal generator may be disposed on a second side of the plurality of pixels, which faces the first side.

Each of the plurality of pixels may include a driving transistor, a light emitting diode that receives an output from the driving transistor, a second transistor that receives the first scan signal through a gate electrode of the second transistor, a third transistor that receives the second scan signal through a gate electrode of the third transistor, a fourth transistor that receives the third scan signal through a gate electrode of the fourth transistor, and a fifth transistor that receives the light emission signal through a gate electrode of the fifth transistor.

A first electrode of the second transistor may be electrically connected to a data line, a second electrode of the second transistor may be electrically connected to a gate electrode of the driving transistor, a first electrode of the third transistor may be electrically connected to a reference voltage line, a second electrode of the third transistor may be electrically connected to the gate electrode of the driving transistor, a first electrode of the fourth transistor may be electrically connected to an initialization voltage line, a second electrode of the fourth transistor may be electrically connected to a second electrode of the driving transistor and an electrode of the light emitting diode, a first electrode of the fifth transistor may be electrically connected to a driving voltage line, and a second electrode of the fifth transistor may be electrically connected to a first electrode of the driving transistor.

Each of the plurality of pixels may further include a first capacitor and a second capacitor, a first electrode of the first capacitor may be electrically connected to the second electrode of the driving transistor and the electrode of the light emitting diode, a second electrode of the first capacitor may be electrically connected to the gate electrode of the driving transistor, a first electrode of the second capacitor may be electrically connected to the driving voltage line, and a second electrode of the second capacitor may be electrically connected to the second electrode of the driving transistor and the electrode of the light emitting diode.

According to an embodiment of the disclosure, a light emitting display device may include a plurality of pixels arranged in a plurality of pixel rows, a first scan signal generator that provides a first scan signal to the plurality of pixels in the plurality of pixel rows, a second scan signal generator that provides a second scan signal to the plurality of pixels in the plurality of pixel rows, a third scan signal generator that provides a third scan signal to the plurality of pixels in the plurality of pixel rows, and a light emission signal generator that provides a light emission signal to the plurality of pixels in the plurality of pixel rows. The light emission signal generator may include a first light emission signal generator and a second light emission signal generator, the first light emission signal generator and the second light emission signal generator may be disposed on each side of the plurality of pixels, the first scan signal generator may include a first-first scan signal generator and a first-second scan signal generator, the first-first scan signal generator and the first-second scan signal generator may be disposed on each side of the plurality of pixels, and each of the second scan signal generator and the third scan signal generator may be disposed on only a side of the plurality of pixels.

The second scan signal generator may be disposed on a first side of the plurality of pixels, and the third scan signal generator may be disposed on a second side of the plurality of pixels, which faces the first side.

Each of the second scan signal generator, the third scan signal generator, and the light emission signal generator may provide a same signal to the plurality of pixels in two of the plurality of pixel rows.

The first scan signal generator may provide a same first scan signal to the plurality of pixels in each of the plurality of pixel rows.

Each of the plurality of pixels may include a driving transistor, a light emitting diode that receives an output from the driving transistor, a second transistor that receives the first scan signal through a gate electrode of the second transistor, a third transistor that receives the second scan signal through a gate electrode of the third transistor, a fourth transistor that receives the third scan signal through a gate electrode of the fourth transistor, and a fifth transistor that receives the light emission signal through a gate electrode of the fifth transistor.

A first electrode of the second transistor may be electrically connected to a data line, a second electrode of the second transistor may be electrically connected to a gate electrode of the driving transistor, a first electrode of the third transistor may be electrically connected to a reference voltage line, a second electrode of the third transistor may be electrically connected to the gate electrode of the driving transistor, a first electrode of the fourth transistor may be electrically connected to an initialization voltage line, a second electrode of the fourth transistor may be electrically connected to a second electrode of the driving transistor and an electrode of the light emitting diode, a first electrode of the fifth transistor may be electrically connected to a driving voltage line, and a second electrode of the fifth transistor may be electrically connected to a first electrode of the driving transistor.

Each of the plurality of pixels may further include a first capacitor and a second capacitor, a first electrode of the first capacitor may be electrically connected to the second electrode of the driving transistor and the electrode of the light emitting diode, a second electrode of the first capacitor may be electrically connected to the gate electrode of the driving transistor, a first electrode of the second capacitor may be electrically connected to the driving voltage line, and a second electrode of the second capacitor may be electrically connected to the second electrode of the driving transistor and the electrode of the light emitting diode.

According to the embodiments, except for the first scan signal generator, one of the light emission signal generator and the scan signal generator may provide a signal to pixels in two rows, or the signal generator may be disposed on only a side of the display area to reduce or limit the area of the non-display area while efficiently using the limited area, ensuring that there are no issues with the display quality of the pixels.

DETAILED DESCRIPTION OF THE EMBODIMENTS

Figure 1:
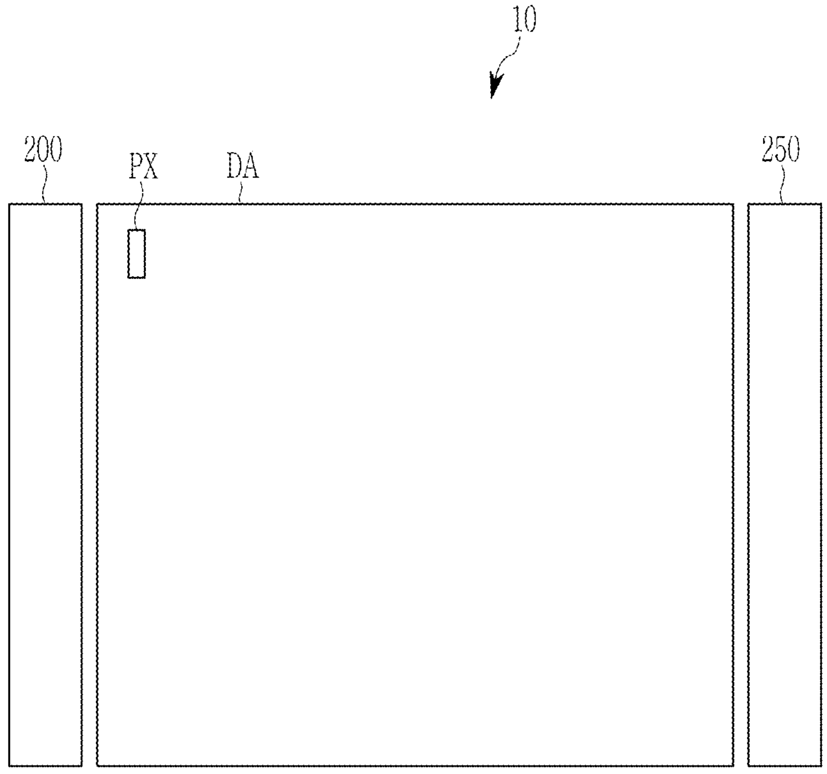
FIG. 1 is a schematic diagram of a light emitting display device according to an embodiment.

In the following description, for the purposes of explanation, numerous specific details are set forth in order to provide a thorough understanding of various embodiments or implementations of the disclosure. As used herein "embodiments" and "implementations" are interchangeable words that are non-limiting examples of devices or methods disclosed herein. It is apparent, however, that various embodiments may be practiced without these specific details or with one or more equivalent arrangements. Here, various embodiments do not have to be exclusive nor limit the disclosure. For example, specific shapes, configurations, and characteristics of an embodiment may be used or implemented in another embodiment.

Hereinafter, with reference to accompanying drawings, various embodiments of the disclosure will be described in detail and thus a person of an ordinary skill can easily practice them in the technical field to which the disclosure belongs. The disclosure may be implemented in many different forms and is not limited to the embodiments described herein.

The size and thickness of each component shown in the drawing are arbitrarily represented for the convenience of description, and thus the disclosure is not necessarily limited to the drawings. In the drawings, the thickness of layers, films, panels, regions, etc., are exaggerated for clarity. In addition, in the drawing, for convenience of explanation, the thickness of some layers and regions is exaggerated.

It will be understood that when an element such as a layer, film, region, or substrate is referred to as being "on" another element, it can be directly on the other element or intervening elements may also be present. In contrast, when an element is referred to as being "directly on" another element, there are no intervening elements present. Further, throughout the specification, the word "on" a target element will be understood to mean positioned above or below the target element, and will not necessarily be understood to mean positioned "at an upper side" based on an opposite to gravity direction.

The terminology used herein is for the purpose of describing particular embodiments and is not intended to be limiting. As used herein, the singular forms, "a," "an," and "the" are intended to include the plural forms as well, unless the context clearly indicates otherwise. In addition, unless explicitly described to the contrary, the word "comprise," "include," and "have" and variations such as "comprises," "comprising," "includes," "including," "has," or "having," will be understood to imply the inclusion of stated elements but not the exclusion of any other elements.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

For the purposes of this disclosure, the phrase "at least one of A and B" may be construed as A only, B only, or any combination of A and B. "At least one of X, Y, and Z" may be construed as X only, Y only, Z only, or any combination of two or more of X, Y, and Z. "At least two of X, Y, and Z," may be construed as two or more of X, Y, and Z such as both X and Y, both X and Z, both Y and Z, both X, Y, and Z. Also, "at least three of X, Y, and Z," may be construed as three or more of X, Y, and Z such as both X, Y, and Z, both X, Y, and Z.

Spatially relative terms, such as "below," "lower," "above," "upper," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the example term "below" can encompass both an orientation of above and below. Furthermore, the apparatus may be otherwise oriented (e.g., rotated 90 degrees or at other orientations), and, as such, the spatially relative descriptors used herein interpreted accordingly.

In the specification and the claims, the term "and/or" is intended to include any combination of the terms "and" and "or" for the purpose of its meaning and interpretation. For example, "A and/or B" may be understood to mean "A, B, or A and B." The terms "and" and "or" may be used in the conjunctive or disjunctive sense and may be understood to be equivalent to "and/or."

Unless otherwise specified, the illustrated embodiments are to be understood as providing example features of the disclosure. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the disclosure.

In order to clearly explain the disclosure, parts irrelevant to the description have been omitted, and the same reference numerals are used for the same or similar constituent elements throughout the specification. Further, the use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. When an embodiment may be implemented differently, a specific process order may be performed differently from the described order.

Various embodiments are described herein with reference to sectional and/or exploded illustrations that are schematic illustrations of embodiments and/or intermediate structures. As such, variations from the shapes of the illustrations as a result, for example, of manufacturing techniques and/or tolerances, are to be expected. Thus, embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

Further, throughout the specification, the phrase "in a plan view" means viewing a target portion from the top, and the phrase "in a cross-sectional view" means viewing a cross-section formed by vertically cutting a target portion from the side.

Throughout the specification, when it is described to be "connected," it does not only mean that two or more constituent elements are directly connected, but also includes cases where two or more constituent elements are indirectly connected through other constituent elements, physically connected, electrically connected and/or fluid connected, as well as cases where each part, which is substantially one entity but referred to by different names depending on position or function, is connected to each other. Further, when a component is described herein to "connect" another component to the other component or to be "connected to" other components, the components may be connected to each other as separate elements, or the components may be integral with each other.

In the specification, when parts such as wiring, layer, film, region, plate, constituent element, and the like are "extended in a first direction or second direction", this does not mean only a straight line shape extending in the corresponding direction but also includes a structure that is generally extended in a first direction or a second direction and a structure that is bent in a part, has a zigzag structure, or a structure extending while including a curved line.

Electronic devices (for example, mobile phone, TV, monitor, laptop computer, and the like) including display devices and display panels described in the specification or electronic devices including display devices and display panels manufactured by a manufacturing method described in the specification are not excluded from the scope of rights of this specification.

Unless otherwise defined or implied herein, all terms (including technical and scientific terms) used have the same meaning as commonly understood by those skilled in the art to which this disclosure pertains. It will be further understood that terms, such as those defined in commonly used dictionaries, should be interpreted as having a meaning that is consistent with their meaning in the context of the relevant art and should not be interpreted in an ideal or excessively formal sense unless clearly defined in the specification.

Hereinafter, embodiments will be described in detail with reference to the accompanying drawings.

Referring to FIG. 1, a structure of a light emitting display device 10 in a plan view will be described.

FIG. 1 is a schematic diagram of a light emitting display device 10 according to an embodiment.

According to an embodiment, a light emitting display device 10 may include a display area DA where multiple pixels PX are formed, and a non-display area disposed adjacent to the display area DA where signal generators 200 and 250 are formed. For example, the signal generators 200 and 250 may be each formed in a portion of the non-display area. The signal generators 200 and 250 may include a scan signal generator that generates a scan signal and a light emission signal generator that generates a light emitting signal, and the signals may be applied to the pixels PX. Each of the signal generators 200 and 250 may be integrally formed, and the signal generators 200 and 250 and the pixel PX may be formed together through a same process. According to an embodiment, the display area DA may be expanded by disposing the signal generators 200 and 250 in the display area and disposing a light emitting diode on the signal generators 200 and 250.

Referring to FIG. 1, the light emitting display device 10 may have a structure in which the light emitting display device 10 may be bent or folded by including a flexible substrate including polyimide (PI), a film, or the like.

The pixel PX of the light emitting display device 10 may include a pixel circuit portion and a light-emitting element portion that receives a current from the pixel circuit portion and emits light. The pixel circuit portion may include a driving transistor that generates a current that is transmitted to the light emitting element portion, a transistor that performs various operations, and a capacitor that stores a voltage. Referring to FIG. 1, the pixel PX may have a rectangular shape in a plan view. The rectangular pixel PX shown in FIG. 1 shows the pixel circuit portion of the pixel PX. The rectangular-shaped pixel circuit portion may be arranged in a matric format. The light emitting element portion included in the pixel PX may be a light emitting diode LED and be disposed on an upper portion of the pixel circuit portion. The light emitting element portion may have various shapes, for example, a quadrangle such as a rhombus, a polygon other than a quadrangle, a circle, an ellipse, or the like in a plan view, and may have various arrangements.

Figure 2:
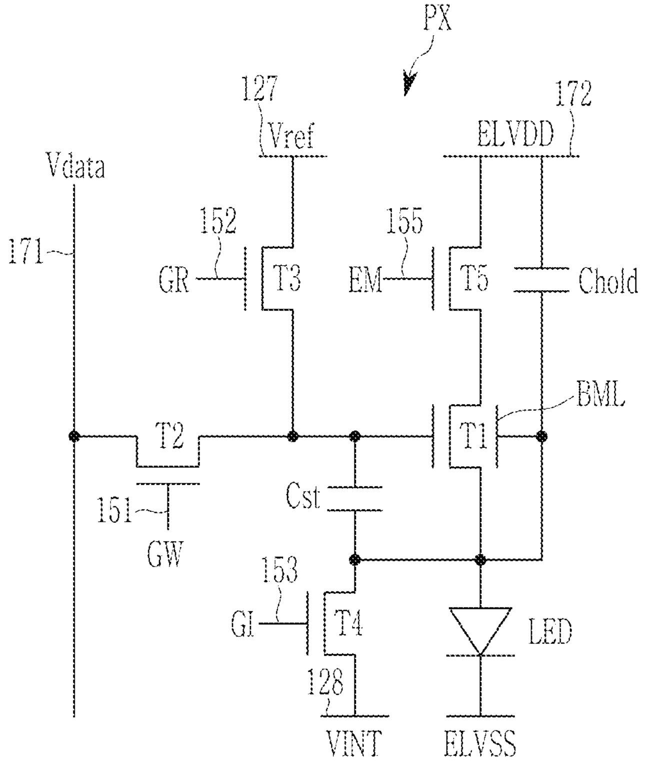
FIG. 2 is a schematic diagram of an equivalent circuit of a pixel included in a light emitting display device according to an embodiment.
Figure 3:
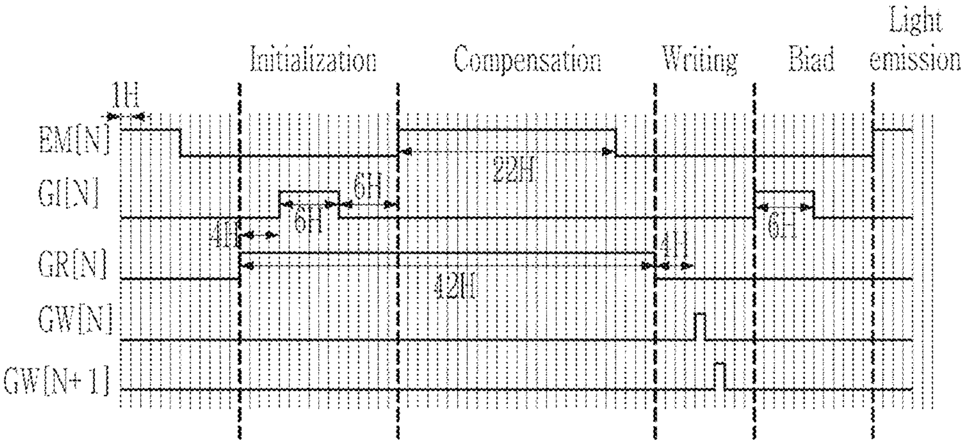
FIG. 3 and FIG. 4 are schematic waveform diagrams of signals applied to the pixel of FIG. 2.
Figure 4:
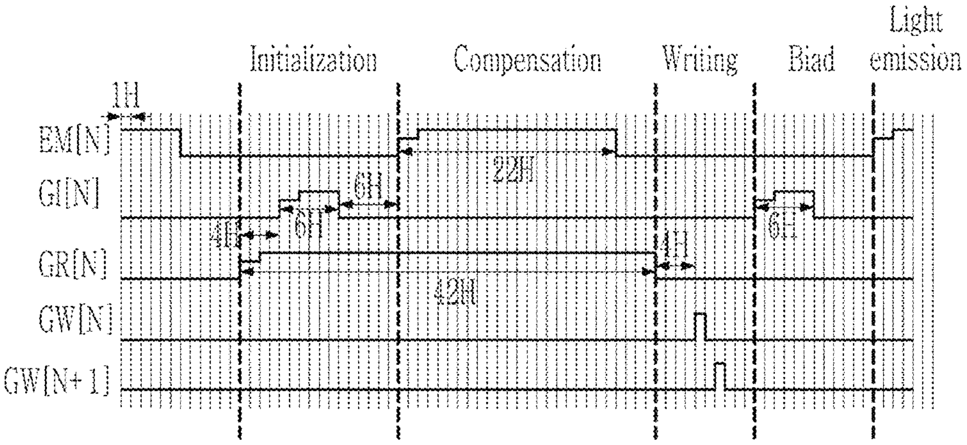

Referring to FIG. 2 to FIG. 4, a pixel PX formed in a light emitting display device 10 according to an embodiment will be described.

Referring to FIG. 2, a circuit structure of a pixel PX will be described.

FIG. 2 is a schematic diagram of an equivalent circuit of a pixel PX included in a light emitting display device 10 according to an embodiment.

In an embodiment, the pixel PX may include an n-type transistor including an oxide semiconductor.

For example, the pixel may include multiple transistors T1, T2, T3, T4, and T5 connected to multiple wires 127, 128, 151, 152, 153, 155, 171, and 172, a storage capacitor Cst (hereinafter, also referred to as a first capacitor), a hold capacitor Chold (also referred to as a second capacitor), and a light emitting diode LED. The transistors (e.g., T1, T2, T3, T4, and T5) and the capacitors (e.g., Cst and Chold) except for the light emitting diode LED may form a pixel circuit portion, and a pixel PX may be divided into a pixel circuit portion and a light emitting diode LED. In an embodiment, all of the transistors T1, T2, T3, T4, and T5 may be n-type transistors, but the disclosure is not limited thereto. In an embodiment, the n-type transistor may be an oxide semiconductor transistor including an oxide semiconductor. The n-type transistor may be a transistor that is turned on in case that a relatively high voltage is applied to a gate electrode.

Multiple wires 127, 128, 151, 152, 153, 155, 171, and 172 may be connected to a pixel PX. The wires 127, 128, 151, 152, 153, 155, 171, and 172 may include a reference voltage line 127, an initialization voltage line 128, a first scan line 151, a second scan line 152, a third scan line 153, a light emission control line 155, a data line 171, and a driving voltage line 172 (in addition to a common voltage line). The common voltage line that transmits a driving low voltage ELVSS to the light emitting diode LED may be connected to the pixel PX.

The first scan line 151 may transmit a first scan signal GW to a gate electrode of a second transistor T2, and the second scan line 152 may transmit a second scan signal GR to a gate electrode of a third transistor T3. The third scan line 153 may transmit a third scan signal GI to a gate electrode of a fourth transistor T4, and the light emission control line 155 may transmit an emission signal EM to a gate electrode of a fifth transistor T5.

The data line 171 may be a wire that transmits a data voltage Vdata generated by a data driver (not shown), and an intensity of a light emitting current transmitted to the light emitting diode LED may change and luminance emitted by the light emitting diode LED may also change. A driving voltage line 172 may transmit a driving voltage ELVDD. A reference voltage line 127 may transmit a reference voltage Vref, and an initialization voltage line 128 may transmit an initialization voltage VINT. In an embodiment, voltages applied to the driving voltage line 172, the reference voltage line 127, and the initialization voltage line 128 may be constant voltages.

The driving transistor T1 (also referred to as a first transistor) may be an n-type transistor and may include an oxide semiconductor as a semiconductor layer. The driving transistor T1 may be a transistor that adjusts an intensity of a light emitting current output to an electrode (anode) of the light emitting diode LED according to a magnitude of a voltage (i.e., a voltage stored in the storage capacitor Cst) of the gate electrode (also referred to as the driving gate electrode or first driving gate electrode) of the driving transistor T1. The intensity of the light emitting current output to the electrode (anode) of the light emitting diode LED may be adjusted according to the data voltage Vdata applied to the pixel PX. For adjusting the intensity of the light emitting current, a first electrode of the driving transistor T1 may receive the driving voltage ELVDD and be connected to the driving voltage line 172 through the fifth transistor T5. A second electrode of the driving transistor T1 may output a light emitting current to the light emitting diode LED, and be connected to the electrode (anode) of the light emitting diode LED. The data voltage Vdata may be applied to the driving gate electrode of the driving transistor T1 through the second transistor T2. The driving gate electrode of the driving transistor T1 may be connected to an electrode (referred to as a second storage electrode) of the storage capacitor Cst. Accordingly, a voltage of the driving gate electrode of the driving transistor T1 may change according to the voltage stored in the storage capacitor Cst, and the light emitting current output by the driving transistor T1 may change according to the voltage of the driving gate electrode of the driving transistor T1. The storage capacitor Cst may maintain the voltage of the driving gate electrode of the driving transistor T1 constant during one frame period. The driving gate electrode of the driving transistor T1 may also be connected to the third transistor T3 and may be initialized by receiving the reference voltage Vref. The driving transistor T1 may further include an overlapping electrode BML (referred to as a second driving gate electrode) overlapping a channel disposed in the semiconductor layer in a plan view, and the overlapping electrode BML may be connected with the electrode (anode) of the light emitting diode LED, a second electrode of the fourth transistor T4, a first storage electrode of the storage capacitor Cst, and a second electrode of the hold capacitor Chold. The overlapping electrode BML may be connected to the electrode (anode) of the light emitting diode LED and the characteristics of the driving transistor T1 may be maintained without change during a light emission period (see, e.g., Light emission of FIG. 3 and FIG. 4).

The second transistor T2 may be an n-type transistor and may include an oxide semiconductor as a semiconductor layer. The second transistor T2 may be a transistor that receives the data voltage Vdata into the pixel PX. The gate electrode of the second transistor T2 may be connected to the first scan line 151. A first electrode of the second transistor T2 may be connected to the data line 171, and a second electrode of the second transistor T2 may be connected to the driving gate electrode of the driving transistor T1, a second electrode of the third transistor T3, and a second storage electrode of the storage capacitor Cst. In case that the second transistor T2 is turned on by a positive voltage of the first scan signal GW transmitted through the first scan line 151, the data voltage Vdata transmitted through the data line 171 may be transmitted to the driving gate electrode of the driving transistor T1, and the data voltage Vdata may be transmitted to the second storage electrode of the storage capacitor Cst. According to embodiments, a boost capacitor, which is a parasitic capacitor, may be formed between the first scan line 151 and the driving gate electrode of the driving transistor T1 (or the second storage electrode of the storage capacitor Cst or the second electrode of the third transistor T3).

The third transistor T3 may be an n-type transistor and include an oxide semiconductor as a semiconductor layer. The third transistor T3 may transmit the reference voltage Vref to the driving gate electrode of the driving transistor T1 and the second storage electrode of the storage capacitor Cst. The gate electrode of the third transistor T3 may be connected to the second scan line 152, and a first electrode of the third transistor T3 may be connected to the reference voltage line 127. The second electrode of the third transistor T3 may be connected to the second storage electrode of the storage capacitor Cst, the driving gate electrode of the driving transistor T1, and the second electrode of the second transistor T2. The third transistor T3 may be turned on by a positive voltage of the second scan signal GR received through the second scan line 152. In case that the third transistor T3 is turned on, the reference voltage Vref may be transmitted to the driving gate electrode of the driving transistor T1 and the second storage electrode of the storage capacitor Cst for initialization.

The fourth transistor T4 may be an n-type transistor and include an oxide semiconductor as a semiconductor layer. The fourth transistor T4 may initialize the electrode (anode) of the light emitting diode LED. Hereinafter, the fourth transistor T4 may also be referred to as a light emitting diode initialization transistor. In case that the fourth transistor T4 initializes the electrode (anode) of the light emitting diode LED, the overlapping electrode BML of the driving transistor T1, the first storage electrode of the storage capacitor Cst, and the second electrode of the hold capacitor Chold may be also initialized. The gate electrode of the fourth transistor T4 may be connected to the third scan line 153, the second electrode of the fourth transistor T4 may be connected to the electrode (anode) of the light emitting diode LED, the overlapping electrode BML of the driving transistor T1, the first storage electrode of the storage capacitor Cst, and the second electrode of the hold capacitor Chold, and a first electrode of the fourth transistor T4 may be connected to the initialization voltage line 128. In case that the fourth transistor T4 is turned on by a positive voltage of the third scan signal GI transmitted through the third scan line 153, the initialization voltage VINT may be applied to the electrode (anode) of the light emitting diode LED, the overlapping electrode BML of the driving transistor T1, the first storage electrode of the storage capacitor Cst, and the second electrode of the hold capacitor Chold for initialization.

The fifth transistor T5 may be an n-type transistor and include an oxide semiconductor as a semiconductor layer. The fifth transistor T5 may transmit the driving voltage ELVDD to the first electrode of the driving transistor T1. The gate electrode of the fifth transistor T5 may be connected to the light emission control line 155, a first electrode of the fifth transistor T5 may be connected to the driving voltage line 172, and a second electrode of the fifth transistor T5 may be connected to the first electrode of the driving transistor T1. In case that the fifth transistor T5 is turned on by a positive voltage of the light emission signal EM transmitted through the light emission control line 155, the driving voltage ELVDD may be applied to the first electrode of the driving transistor T1.

According to embodiments, all of the transistors T1, T2, T3, T4, and T5 may include overlapping electrodes BML overlapping channels included in the semiconductor layer in a plan view, and in the transistors T2, T3, T4, and T5 except for the driving transistor T1, each overlapping electrode BML may be electrically connected to each gate electrode, and each overlapping electrode BML may serve as another gate electrode (referred to as dual gate electrode).

As described above, the transistors T1, T2, T3, T4, and T5 may be n-type transistors and include oxide semiconductor as the semiconductor layer, but the disclosure is not limited thereto. In an embodiment, an n-type transistor may be used, and the n-type transistor may include silicon semiconductor as a semiconductor layer.

The first storage electrode of the storage capacitor Cst may be connected to the second electrode of the fourth transistor T4, the second electrode of driving transistor T1, the overlapping electrode BML of the driving transistor T1, the electrode (anode) of the light emitting diode LED, and the second electrode of the hold capacitor Chold, and the second storage electrode of the storage capacitor Cst may be connected to the driving gate electrode of the driving transistor T1, the second electrode of the third transistor T3, and the second electrode of the second transistor T2. The storage capacitor Cst may maintain a voltage of the driving gate electrode of the driving transistor T1 constant during one frame period.

The first electrode of the hold capacitor Chold may be connected to the driving voltage line 172, and the second electrode of the hold capacitor Chold may be connected to the overlapping electrode BML of the driving transistor T1, the second electrode of the driving transistor T1, the electrode (anode) of the light emitting diode LED, the second electrode of the fourth transistor T4, and the first storage electrode of the storage capacitor Cst. The hold capacitor Chold may maintain a voltage of the overlapping electrode BML of the driving transistor T1 and the electrode (anode) of the light emitting diode LED to be constant, for example, may maintain a constant voltage of the overlapping electrode BML of the driving transistor T1 and the electrode (anode) of the light emitting diode LED during a light emission period.

FIG. 2 illustrates that the pixel PX includes five transistors T1, T2, T3, T4, and T5 and two capacitors (i.e., storage capacitor Cst and hold capacitor Chold), but the disclosure is not limited thereto. In an embodiment, the pixel PX may also include a parasitic capacitor, for example, a boost capacitor formed between the first scan line 151 and the driving gate electrode of the driving transistor T1 (or second storage electrodes of the storage capacitor Cst).

In the above, referring to FIG. 2, the circuit structure of the pixel PX according to an embodiment has been described. Hereinafter, a waveform of a signal applied to the pixel PX of FIG. 2 and operation of the pixel PX according to the waveform will be described with reference to FIG. 3 and FIG. 4.

FIG. 3 and FIG. 4 are schematic waveform diagrams of signals applied to the pixel of FIG. 2.

Operation of the pixel PX of FIG. 2 will be described in detail with reference to FIG. 3.

Referring to FIG. 3, in case that a signal applied to the pixel PX is divided into periods, the periods may be divided into an initialization period Initialization, a compensation period Compensation, a writing period Writing, and a light emission period Light emission (in addition to a bias period Biad between the writing period Writing and the light emission period Light emission). Even in case that a data voltage Vdata is not transmitted during the writing period Writing, the bias period Biad may maintain a voltage relationship of each electrode (e.g., the driving gate electrode, the first electrode, the second electrode, and the overlapping electrode BML) of the driving transistor T1 not to be changed, may assist the driving transistor T1 to perform the same operation, and assist the light emitting display device 10 to be driven with various driving methods such as a low-power driving method, a high-speed driving method, and the like. A gate-on voltage and a gate-off voltage may be a high voltage or a low voltage depending on a type of a transistor to which the gate-on voltage and the gate-off voltage are applied, and for an n-type transistor, a high voltage may be the gate-on voltage and a low voltage may be the gate-off voltage.

The light emission period Light emission may be a period in which the light emitting diode LED emits light, and the gate-on voltage of the light emitting signal EM may be transmitted to and turn on the fifth transistor T5. All other signals (e.g., second scan signal GR, third scan signal GI, first scan signal GW) may have gate-off voltages. In case that the fifth transistor T5 is turned on and the driving voltage ELVDD is transmitted to the driving transistor T1, an output current may be generated according to the voltage of the driving gate electrode of the driving transistor T1. The output current of the driving transistor T1 may be transmitted to the light emitting diode LED, and the light emitting diode LED may emit light. In order to ensure that the characteristics of the driving transistor T1 that generates the output current during the light emission period Light emission are constant, the overlapping electrode BML of the driving transistor T1 and the electrode (anode) of the light emitting diode LED may be electrically connected with each other. Although FIG. 3 illustrates that the light emission period Light emission in which the light emission signal EM applies the gate-on voltage is short, the light emission period Light emission may actually have the longest duration among the periods. However, since the light emission period Light emission performs a simple operation as described above, FIG. 3 briefly illustrates the light emission period Light emission without additional description.

After the light emission period Light emission ends, an initialization period Initialization may start.

The light emission period Light emission may end as the emission signal EM is changed to the gate-off voltage. After the emission signal EM changes to the gate-off voltage, the second scan signal GR may be changed to the gate-on voltage and the initialization period Initialization may start. The third scan signal GI may also be changed to the gate-on voltage during the initialization period Initialization. During the initialization period Initialization, the light emission signal EM and the first scan signal GW may maintain the gate-off voltage.

In the initialization period Initialization, the third transistor T3 that receives the second scan signal GR may be turned on. The reference voltage Vref may be transmitted to the driving gate electrode of the driving transistor T1 and the second storage electrode of the storage capacitor Cst, and the driving gate electrode of the driving transistor T1 and the second storage electrode of the storage capacitor Cst may be initialized by the turned-on third transistor T3. The reference voltage Vref may have a high voltage that can turn on the driving transistor T1.

After the driving gate electrode of the driving transistor T1 is initialized, the fourth transistor T4 that receives the third scan signal GI may be turned on, and the initialization voltage VINT may be transmitted to the electrode (anode) of the light emitting diode LED, the first storage electrode of the storage capacitor Cst, the second electrode of the hold capacitor Chold, the second electrode of the driving transistor T1, and the overlapping electrode BML of driving transistor T1, and the electrode (anode) of the light emitting diode LED may be initialized by the turned-on fourth transistor T4.

After the third scan signal GI is changed to the gate-off voltage, the emission signal EM may be changed to the gate-on voltage, and a compensation period Compensation may start. During the compensation period Compensation, the second scan signal GR may be maintained at a gate-on voltage, and the first scan signal GW may be maintained at a gate-off voltage.

The fifth transistor T5 may be turned on by the light emission signal EM, and the driving voltage ELVDD may be transmitted to the first electrode of the driving transistor T1. In the initialization period Initialization, a voltage of the first storage electrode of the storage capacitor Cst may be charged with the initialization voltage VINT, the driving transistor T1 may be turned on by the reference voltage Vref, and the driving voltage ELVDD transmitted to the first electrode of the driving transistor T1 may be transmitted to the first storage electrode of the storage capacitor Cst and the voltage of the first storage electrode of the storage capacitor Cst may increase. As the voltage of the first storage electrode of the storage capacitor Cst increases and becomes lower than the voltage of the driving gate electrode of the driving transistor T1 by a threshold voltage Vth, the driving transistor T1 may be turned off, and the voltage may be stored in the first storage electrode of the storage capacitor Cst. Since the voltage of the driving gate electrode of the driving transistor T1 has a value of the reference voltage Vref, the voltage of the first storage electrode of the storage capacitor Cst may be as shown in Equation 1 below.

$$\text{Voltage of first storage electrode} = Vref - Vth \quad \text{[Equation 1]}$$

Referring to FIG. 2, the first storage electrode of the storage capacitor Cst and the overlapping electrode BML of the driving transistor T1 may be connected, and the voltage of the overlapping electrode BML of the driving transistor T1 and a voltage of the first storage electrode of the storage capacitor Cst may be the same.

After the light emission signal EM is changed to the gate-off voltage, the second scan signal GR may also be changed to the gate-off voltage and a writing period Writing may start.

During the writing period Writing, a gate-on voltage of the first scan signal GW may be applied for 1H period, and the gate-on voltage of the first scan signal GW may be sequentially applied to the first scan line 151 of each pixel row.

The second transistor T2 may be turned on by the gate-on voltage of the first scan signal GW, and the data voltage Vdata may be transmitted to the driving gate electrode of the driving transistor T1 and the second storage electrode of the storage capacitor Cst through the turned-on second transistor T2. Since the voltage of the second storage electrode of the storage capacitor Cst changes, the voltage of the first storage electrode of the storage capacitor Cst may also change proportionally.

Since the voltage of the second storage electrode of the storage capacitor Cst having the reference voltage Vref before the writing period Writing is changed to the data voltage Vdata during the writing period Writing, the voltage of the second storage electrode of the storage capacitor Cst may be fluctuated by a value obtained by subtracting the reference voltage Vref from the data voltage Vdata. Therefore, the voltage of the first storage electrode of the storage capacitor Cst may be varied by the value obtained by subtracting the reference voltage Vref from the data voltage Vdata at the maximum. Since the voltage of the first storage electrode of the storage capacitor Cst before the writing period Writing starts is equal to Equation 1, the voltage of the first storage electrode of the storage capacitor Cst after the writing period Writing may be equal to Equation 2 below.

$$\text{Voltage of first storage electrode} = Vref - Vth + \alpha(Vdata - Vref) \quad \text{[Equation 2]}$$

After the voltage of the first storage electrode of the storage capacitor Cst is changed, referring to FIG. 3, the light emission signal EM may be changed to the gate-on voltage, and the light emission period Light emission may start.

During the light emission period Light emission, the gate-on voltage of the light emission signal EM may be transmitted to the fifth transistor T5, the fifth transistor T5 may be turned on, the driving voltage ELVDD may be transmitted to the first electrode of the driving transistor T1, and the driving transistor T1 may generate an output current.

The output current of the driving transistor T1 may be determined according to a value obtained by subtracting the threshold voltage Vth from the degree of the voltage of the driving gate electrode of the driving transistor T1 higher than the voltage of the second electrode of the driving transistor T1. Since the voltage of Equation 2 and the voltage of the second electrode of the driving transistor T1 are the same, and the voltage of the driving gate electrode of the driving transistor T1 and the data voltage Vdata are the same, the output current of the driving transistor T1 may be proportional to a value obtained by subtracting the voltage of Equation 2 and the threshold voltage Vth of Equation 2 from the data voltage Vdata. In summary, the output current of driving transistor T1 may be equal to Equation 3.

$$\text{Output current} \propto (1-\alpha)(Vdata - Vref) \quad \text{[Equation 3]}$$

In Equation 3, the output current may be independent from the threshold voltage Vth of the driving transistor T1, and even though the threshold voltage Vth of each driving transistor T1 varies, the output current value may not be affected by the threshold voltage Vth, and the display quality of the pixel PX may not deteriorate and may be kept constant.

Referring to FIG. 2, since the overlapping electrode BML of the driving transistor T1 may also be connected to the second electrode of the driving transistor T1, the characteristics of the channel of the driving transistor T1 may be maintained without being changed.

Referring to FIG. 3, after the writing period Writing ends, a bias period Biad may start, and during the bias period Biad, the third scan signal GI may be changed to a gate-on voltage at least once and be changed to a gate-off voltage again.

In case that the third scan signal GI of a high-level voltage is applied, the voltage of the overlapping electrode BML of the driving transistor T1 may be changed to the initialization voltage VINT. Even in case that the voltage of the overlapping electrode BML of the driving transistor T1 is changed due to a leakage current and/or the like, the voltage of the overlapping electrode BML of the driving transistor T1 may be refreshed, and the voltage of the other electrodes (e.g., the driving gate electrode, the first electrode, and the second electrode) of the driving transistor T1 may also be refreshed to prevent the characteristics of the driving transistor T1 from being fluctuated. Although the data voltage Vdata is not applied during the writing period Writing and in case that the data voltage Vdata applied during the previous frame period is lowered, the voltage may be increased again during the bias period Biad and maintain the output current of the driving transistor T1 constant during the light emission period Light emission. As a result, the light emitting display device 10 may have various driving methods such as a low-power driving method, a high-speed driving method, and the like.

According to embodiments, the bias period Biad may be omitted in a pixel driving method. According to an embodiment, the pixel driving method may include a first driving method including a bias period Biad and a second driving method not including a bias period Biad, and the pixel PX may be operated with the first driving method in some periods and with the second driving method in the remaining periods.

FIG. 3 illustrates driving timing as below.

For example, as the second scan signal GR is changed to the gate-on voltage, the initialization period Initialization may start. The second scan signal GR may be changed to the gate-on voltage, the third scan signal GI may be changed to the gate-on voltage after 4H period, and the third scan signal GI may maintain the gate-on voltage for 6H period.

The third scan signal GI may be changed to the gate-off voltage, and after 6H period, the light emission signal EM may be changed to the gate-on voltage and the compensation period Compensation starts. The light emission signal EM may maintain the gate-on voltage for 22H period. The second scan signal GR may maintain the gate-on voltage for a total of 42H period, and the compensation period Compensation may end as the second scan signal GR is changed to the gate-off voltage.

The second scan signal GR may be changed to the gate-off voltage, and after 4H period passes, the first scan signal GW may be changed to the gate-on voltage and the data voltage Vdata may be written (or applied) to the pixel PX.

As the third scan signal GI changes to the gate-on voltage, the bias period Biad may start, and the gate-on voltage of the third scan signal GI may be maintained for 6H period.

The driving timing as described above may be variously changed according to embodiments.

In the above, based on FIG. 3, the operation of pixel PX has been described.

The waveform diagram of FIG. 4 and the waveform diagram of FIG. 3 may differ at least in that a waveform of FIG. 4 rises twice in case that some signals change from low voltage to high voltage.

Although the embodiment of FIG. 4 has two high voltage levels, both the two high voltage levels may correspond to the gate-on voltage that can turn on the transistor, and an operation of the pixel PX with the waveform diagram of FIG. 4 and the operation of pixel PX with the waveform diagram of FIG. 3 may be the same.

Accordingly, additional description for FIG. 4 will not be repeated.

Hereinafter, a detailed structure of the signal generators 200 and 250 disposed at opposite sides (or each side) of the display area DA will be described with reference to FIG. 5.

Figure 5:
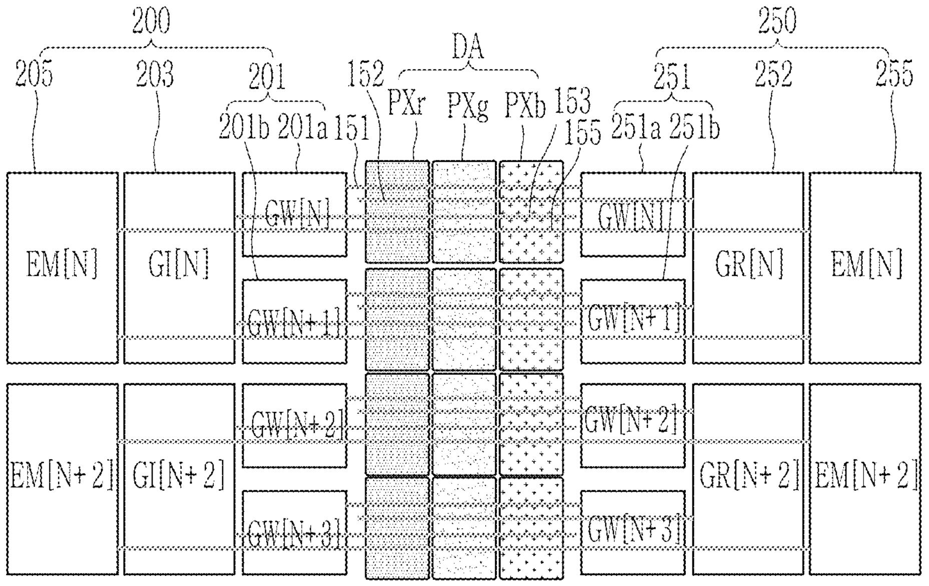
FIG. 5 is a schematic block diagram of the light emitting display device according to an embodiment.

FIG. 5 is a schematic block diagram of the light emitting display device 10 according to an embodiment.

FIG. 5 schematically illustrates that the display area DA includes one red pixel PXr, one green pixel PXg, and one blue pixel PXb arranged in a pixel row, however, the disclosure is not limited thereto. According to embodiments, only at least one of pixels PXr, PXg, and PXb having three colors (referred to as three color pixels) may be disposed in a pixel row, and the three color pixels PXr, PXg, and PXb may be arranged in two pixel rows. Each of the three color pixels PXr, PXg, and PXb may have the pixel PX having a structure shown in FIG. 2, and may be applied with a signal of the waveform shown in FIG. 3 or FIG. 4.

The pixels PXr, PXg, and PXb disposed in the display area DA may be divided into multiple pixel rows arranged in a row direction.

FIG. 5 illustrates that the each pixel row of the pixels PXr, PXg, and PXb has a structure in which the first scan line 151, the second scan line 152, the third scan line 153, and the light emission control line 155 pass and overlap each pixel row, and schematically illustrates that a structure in which the first scan line 151, the second scan line 152, the third scan line 153, and the light emission control line 155 are electrically connected to each of the pixels PXr, PXg, and PXb and extended in the row direction. The first scan line 151 may transmit the first scan signal GW, the second scan line 152 may transmit the second scan signal GR, the third scan line 153 may transmit the third scan signal GI, and the light emission control line 155 may transit the light emission signal EM to the pixels PXr, PXg, and PXb.

The signal generators 200 and 250 may be disposed on each side of the display area DA in non-display areas disposed adjacent to the display area DA. Referring to FIG. 5, the first signal generator 200 may be disposed on a left side of the display area DA, and the second signal generator 250 may be disposed on a right side of the display area DA in a plan view. The signal generators included in the first signal generator 200 and the second signal generator 250 may be different from each other.

In the signal generators 200 and 250, first scan signal generators 201 and 251 may provide the first scan signal GW to the pixels PXr, PXg, and PXb in a pixel row, a second scan signal generator 252 may provide the second scan signal GR to the pixels PXr, PXg, and PXb in a pixel row, a third scan signal generator 203 may provide the third scan signal GI to the pixels PXr, PXg, and PXb in a pixel row, and light emission signal generators 205 and 255 may provide the light emission signal EM to the pixels PXr, PXg, and PXb in a pixel row.

In an embodiment, referring to FIG. 5, the first signal generator 200 may include the first light emission signal generator 205 that generates the light emission signal EM, the third scan signal generator 203 that generates the third scan signal GI, and a first-first scan signal generator 201 that generates the first scan signal GW.

The second signal generator 250 may include the second light emission signal generator 255 that generates the light emission signal EM, the second scan signal generator 252 that generates the second scan signal GR, and a first-second scan signal generator 251 that generates the first scan signal GW.

The light emission signal generators 205 and 255, the second scan signal generator 252, and third scan signal generator 203, which generate the light emission signal EM, the second scan signal GR, and the third scan signal GI, respectively, may apply a same signal to pixels PXr, PXg, and PXb in two pixel rows. On the contrary, the first scan signal generators 201 and 251 that generate the first scan signal GW may respectively apply a same signal to pixels PXr, PXg, and PXb in a pixel row. The first-first scan signal generator 201 may include two first-first scan signal generators 201*a* and 201*b* corresponding to pixels PXr, PXg, and PXb in two pixel rows connected to the first light emission signal generator 205 or the third scan signal generator 203. The first-second scan signal generator 251 may include two first-second scan signal generators 251*a* and 251*b* corresponding to pixels PXr, PXg, and PXb in two pixel rows connected to the second light emission signal generator 255 or the second scan signal generator 252.

In an embodiment, referring to FIG. 5, the light emission signal EM and the first scan signal GW may be formed by the light emission signal generators 205 and 255 and the first-first and first-second scan signal generators 201 and 251 (referred to as first scan signal generators) in the respective signal generators 200 and 250 disposed at both sides of the display area DA such that the same light emission signal EM and first scan signal GW are applied to pixels PXr, PXg, and PXb of the pixel row on both sides of the display area DA. On the contrary, the signal generator generating the second scan signal GR and the third scan signal GI may be disposed only on a side of the display area DA. For example, in an embodiment, referring to FIG. 5, the second scan signal GR may be formed only in the second signal generator 250 disposed on the right side of the display area DA, and the third scan signal GI may be formed only in the first signal generator 200 disposed on the left side of the display area DA. As a result, the second scan signal GR and the third scan signal GI may be applied to pixels PXr, PXg, and PXb in a pixel row from a side of the display area DA.

As shown in FIG. 5, even in case that a same light emission signal EM, second scan signal GR, and third scan signal GI is applied to the pixels PXr, PXg, and PXb in two pixel rows, the pixels PXr, PXg, and PXb including an n-type transistor including an oxide semiconductor and having the circuit structure of FIG. 2 may perform a normal operation. As shown in FIG. 5, although the second scan signal GR and the third scan signal GI are generated and applied only in a side of the display area DA, the pixels PXr, PXg, and PXb including an n-type transistor including an oxide semiconductor and having the circuit structure of FIG. 2 may perform normal operation without any problem. As a result, a space of the non-display area disposed on the left and right of the display area DA may be formed narrow, and the space of the non-display area may be efficiently used.

For example, in general, the signal generator that generates each signal may be arranged in each pixel row or arranged with a same number on right and left sides to output each signal constant, and the area of the non-display area may be inevitably increased.

Although each of signals applied to the pixel PX of FIG. 2 has a difference in a time and a role, some of the signals may not affect a display quality even in case that it is applied from only a side of the display area DA, and another signals may need to be applied from both sides of the display area DA not to affect the display quality. Some signals may need to be applied per each pixel row, but another signal may be applied per multiple pixel rows.

For example, although a light emission signal EM is equally applied to the pixels PXr, PXg, and PXb in two pixel rows, there may be no risk to the operation of the pixels PXr, PXg, and PXb having the circuit structure of FIG. 2, and the display quality may not deteriorate. A signal, such as the second scan signal GR and third scan signal GI, that initializes the electrode (anode) of the light emitting diode LED or the driving gate electrode of the driving transistor T1, may operate the pixels PXr, PXg, and PXb having the circuit structure of FIG. 2 without any problem, as long as a sufficient time interval between signals is secured and the signal may be applied from a side of the display area DA.

In the waveform diagram of FIG. 3 or FIG. 4, applied to the pixels PXr, PXg, and PXb of FIG. 2, a time interval between second scan signal GR and third scan signal GI, a time interval between third scan signal GI and light emission signal EM, and/or a time interval between second scan signal GR and first scan signal GW may be adjusted, and even in case that a signal is applied from a side of the display area DA, a risk may be minimized and problems with display quality may not occur.

Considering this, an embodiment in which the display quality is not affected is shown in FIG. 5.

In an embodiment, each signal generator may include an output transistor (also referred to as a buffer transistor), and the larger the area of the transistor, the more stable the voltage of the output signal is, and in case that the area is used efficiently as shown in FIG. 5, an area of the output transistor of each signal generator may be sufficiently secured, and the generated signal may be stable.

On the other hand, in order to reduce the area of the non-display area, the area of a transistor including an output transistor disposed in each signal generator may be reduced, but signal stability may be deteriorated, and display quality may be deteriorated. However, according to the embodiment, it may be possible to secure display quality and reduce the area of non-display area.

Hereinafter, a structure (e.g., a detailed structure) of each signal generator according to an embodiment of FIG. 5 will be described with reference to FIG. 6 to FIG. 9.

FIG. 6 to FIG. 9 are schematic block diagrams of the signal generators 200 and 250 according to an embodiment.

Figure 6:
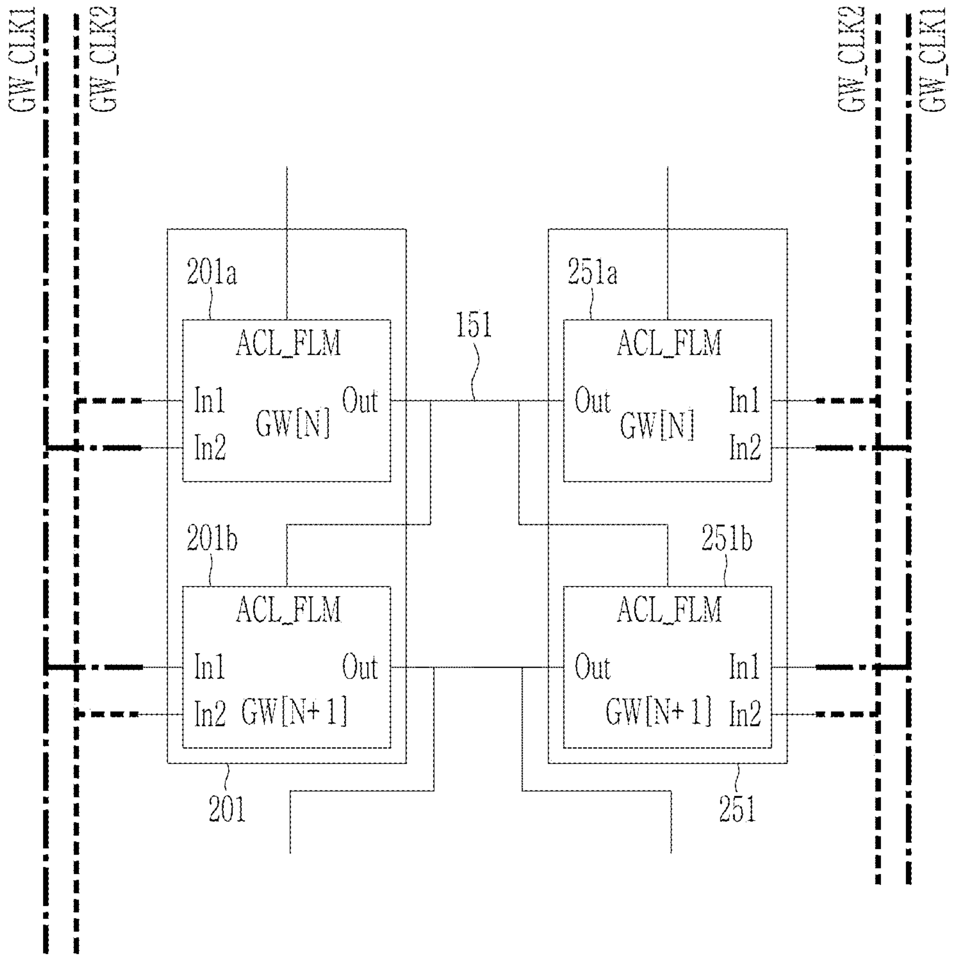
FIG. 6 to FIG. 9 are schematic block diagrams of signal generators according to an embodiment.
Figure 7:
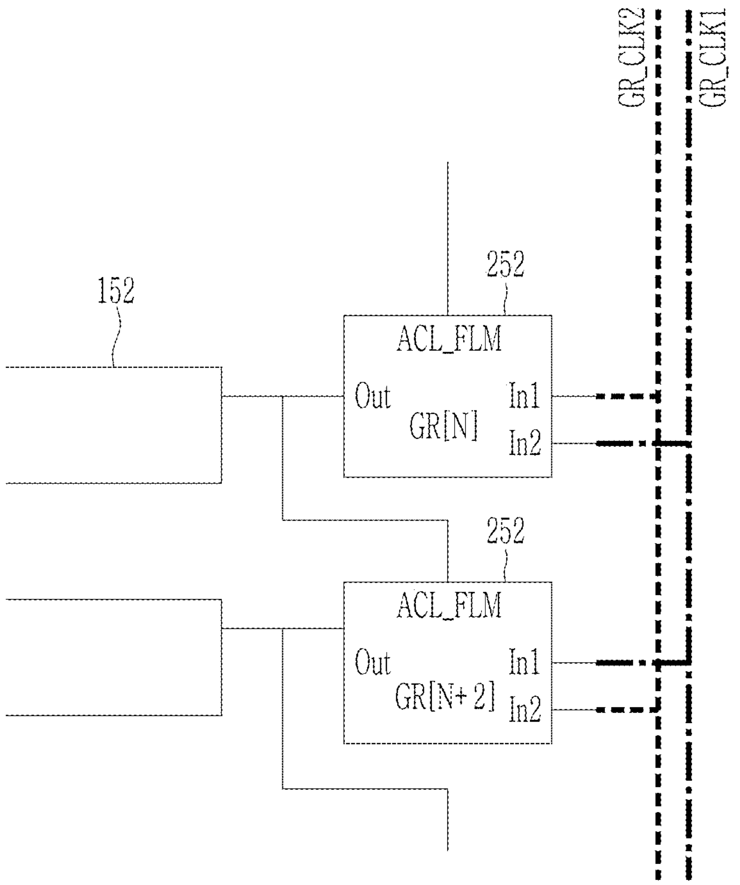
Figure 8:
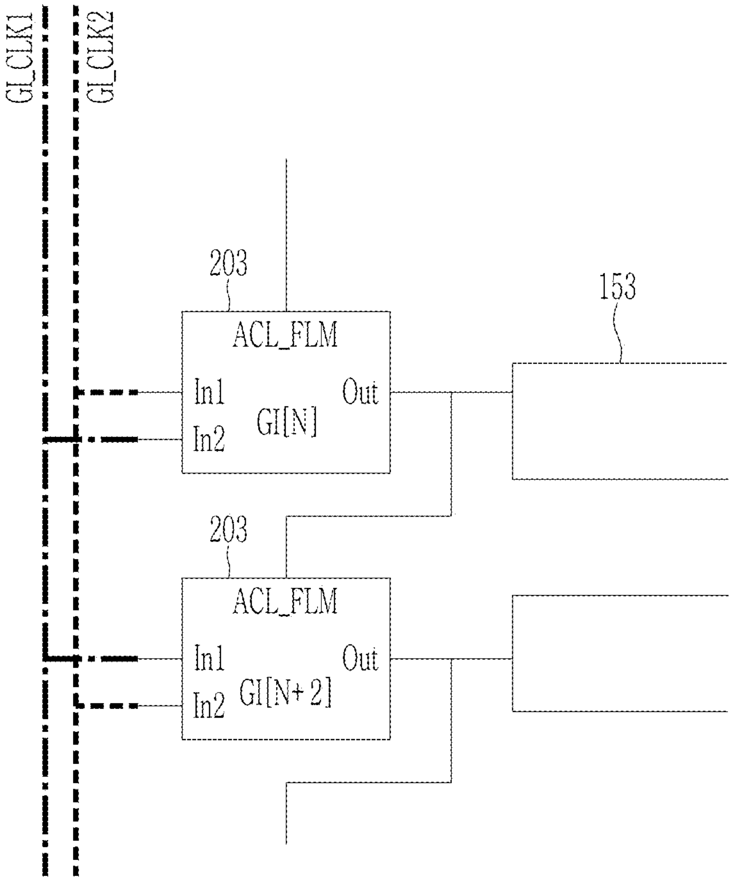
Figure 9:
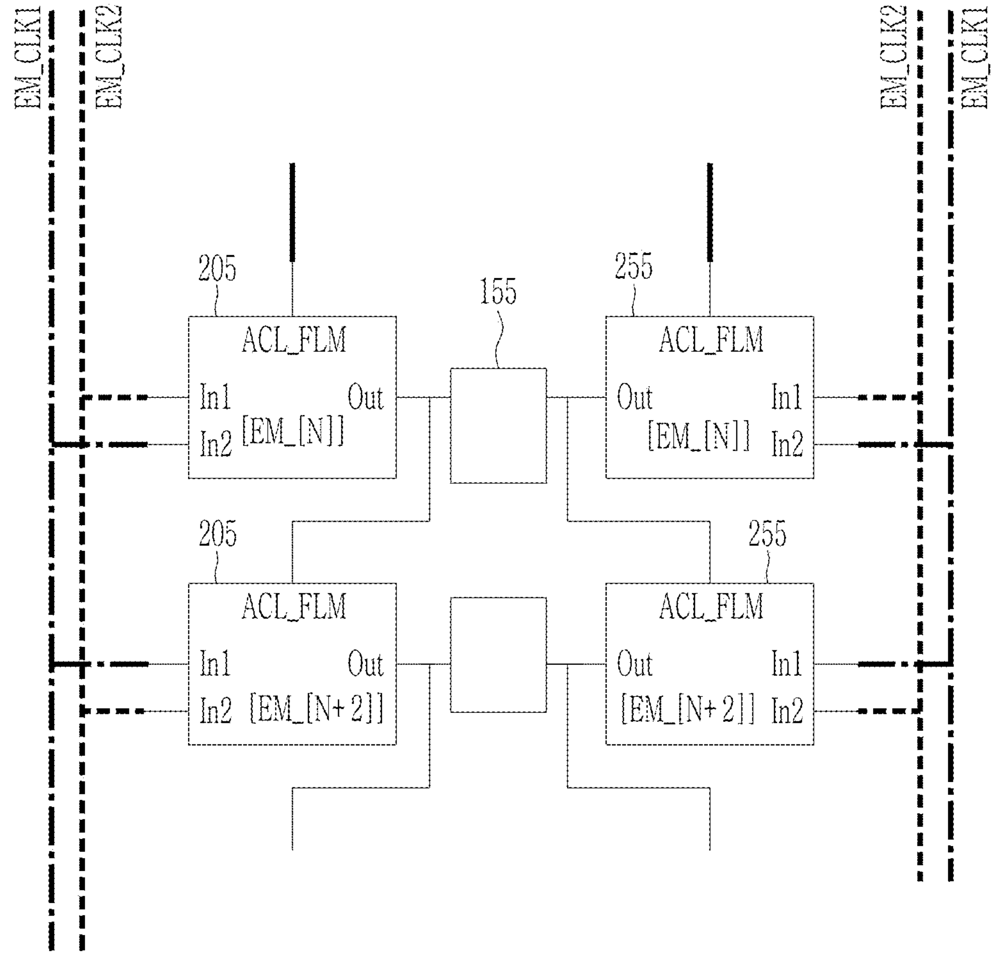

FIG. 6 schematically illustrates the first scan signal generator 201 and 251 that generates the first scan signal GW, FIG. 7 schematically illustrates the second scan signal generator 252 that generates the second scan signal GR, FIG. 8 schematically illustrates the third scan signal generator 203 that generates the third scan signal GI, and FIG. 9 schematically illustrates the light emission signal generators 205 and 255 that generates the light emission signal EM.

Referring to FIG. 6, a structure of the first scan signal generators 201 and 251 that generates the first scan signal GW will be described.

The first-first scan signal generator 201 disposed at the left side of the display area DA may include the first first-first scan signal generator 201*a* electrically connected with PXr, PXg, and PXb in a first pixel row among the pixels PXr, PXg, and PXb in two pixel rows, and the second first-first scan signal generator 201*b* electrically connected with the pixels PXr, PXg, and PXb in a second pixel row.

The first-second scan signal generator 251 disposed at the right side of the display area DA may include the first first-second scan signal generator 251*a* electrically connected with the pixels PXr, PXg, and PXb in the first pixel row among the pixels PXr, PXg, and PXb in two pixel rows, and the second first-second scan signal generator 251*b* electrically connected with the pixels PXr, PXg, and PXb in the second pixel row.

The first first-first scan signal generator 201*a* and the second first-first scan signal generator 201*b* of the first-first scan signal generator 201, and the first first-second scan signal generator 251*a* and the second first-second scan signal generator 251*b* of the first-second scan signal generator 251 may also be referred to as first scan signal generators 201*a*, 201*b*, 251*a*, and 251*b* and all may have a same circuit structure.

Each of the first scan signal generators 201*a*, 201*b*, 251*a*, and 251*b* may include two clock input terminals In1 and In2, a control terminal ACL_FLM, and an output terminal Out. Each of the first scan signal generators 201*a*, 201*b*, 251*a*, and 251*b* may generate a first scan signal GW using a clock signal input from the clock input terminals In1 and In2 and a start signal input from the control terminal ACL_FLM and output the first scan signal GW through the output terminal Out.

Different clock signals GW_CLK1 and GW_CLK2 may be applied to the clock input terminals In1 and In2 of each of the first scan signal generators 201*a*, 201*b*, 251*a*, 251*b*. In an embodiment, referring to FIG. 6, the first first-first scan signal generator and first first-second scan signal generator 201*a* and 251*a* (also referred to as first first scan signal generators) may receive a second clock signal GW_CLK2 from the first clock input terminal In1 and receive a first clock signal GW_CLK1 from the second clock input terminal In2. On the other hand, unlike the first scan signal generators 201*a* and 251*a*, the second first-first scan signal generator and the second first-second scan signal generator 201*b* and 251*b* (also referred to as second first scan signal generators) may receive the first clock signal GW_CLK1 from the first clock input terminal In1, and receive the second clock signal GW_CLK2 from the second clock input terminal In2.

The output terminal Out of each of the first scan signal generators 201*a*, 201*b*, 251*a*, and 251*b* may output the first scan signal GW, and the first scan signal GW may be transmitted to the pixels PXr, PXg, and PXb in a pixel row through the first scan line 151. Since the first scan signal generators 201*a*, 201*b*, 251*a*, and 251*b* are disposed on both sides of each pixel row, pixels PXr, PXg, and PXb in a pixel row may receive a same first scan signal GW from the first scan signal generators 201*a*, 201*b*, 251*a*, 251*b* from both sides.

The first scan signal GW output from each of the first scan signal generators 201*a*, 201*b*, 251*a*, and 251*b* through the output terminal Out may also be input to a control terminal ACL_FLM of another first scan signal generators 201*a*, 201*b*, 251*a*, and 251*b* (e.g., first first scan signal generators 201*a*, 201*b*, 251*a*, and 251*b* of next pixel row) connected to the pixels PXr, PXg, and PXb in another pixel row (or the next pixel row). In an embodiment, referring to FIG. 6, the first scan signal GW output through the output terminal Out of the first first scan signal generators 201*a* and 251*a* may be transmitted to the control terminal ACL_FLM of the second first scan signal generators 201*b* and 251*b* of the pixels PXr, PXg, and PXb in the next pixel row. The first scan signal GW output through the output terminal Out of the second first scan signal generators 201*b* and 251*b* may be transmitted to the control terminal ACL_FLM of the first first scan signal generators 201*a* and 251*a* disposed therebelow. For example, the first scan signal GW may also be used as a carry signal for the first scan signal generators 201*a*, 201*b*, 251*a*, and 251*b* disposed in the next pixel row.

In order to generate the first scan signal GW in a first scan signal generator 201 and 251 connected to the pixels PXr, PXg, and PXb in the first pixel row, a first scan signal generator 201 and 251 corresponding to a 0-th pixel row may be formed, and according to embodiments, the first scan signal GW of the first pixel row may be generated by applying only a start signal to the control terminal ACL_FLM of the first scan signal generator 201 and 251 corresponding to the pixels PXr, PXg, and PXb Feb. 2, 2024 in the first pixel row.

Referring to FIG. 7, a structure of the second scan signal generator 252 that generates the second scan signal GR will be described.

The second scan signal generator 252, disposed on the right side of the display area DA, may be electrically connected to all of the pixels PXr, PXg, and PXb in two pixel rows. As a result, a same second scan signal GR may be applied to the pixels PXr, PXg, and PXb in the first pixel row and the pixels PXr, PXg, and PXb in the second pixel row. The second scan signal generators 252 electrically connected to the pixels PXr, PXg, and PXb in each row may have a same circuit structure.

Each second scan signal generator 252 may include two clock input terminals In1 and In2, a control terminal ACL_FLM, and an output terminal Out. Each second scan signal generator 252 may generate a second scan signal GR using the clock signal input from the clock input terminals In1 and In2 and the start signal input from the control terminal ACL_FLM and output the second scan signal GR through the output terminal Out.

Different clock signals GR_CLK1 and GR_CLK2 may be received from the clock input terminals In1 and In2 of each second scan signal generator 252. In an embodiment, referring to FIG. 7, the second scan signal generator 252 electrically connected to the pixels PXr, PXg, and PXb in the first and second pixel rows may receive a second clock signal GR_CLK2 from the first clock input terminal In1 and receive a first clock signal GR_CLK1 from the second clock input terminal In2. The second scan signal generator 252 electrically connected to the pixels PXr, PXg, and PXb in the third and fourth pixel rows may receive the first clock signal GR_CLK1 from the first clock input terminal In1 and receive the second clock signal GR_CLK2 from the second clock input terminal In2.

The output terminal Out of each second scan signal generator 252 may output the second scan signal GR, and the output second scan signal GR may be transmitted through the second scan line 152 to the pixels PXr, PXg, and PXb in the two pixel rows. Since the second scan signal generator 252 is disposed only on the right side of the pixel row, the pixels PXr, PXg, and PXb in the two pixel rows may receive the second scan signal GR only from a side.

The second scan signal GR output from each second scan signal generator 252 through the output terminal Out may also be input to the control terminal ACL_FLM of the second scan signal generator 252 in the next pixel row. For example, the second scan signal GR may also be used as a carry signal for the second scan signal generator 252 disposed in the next pixel row.

In order to apply the second scan signal GR to the second scan signal generator 252 connected to the pixels PXr, PXg, and PXb in the first pixel row, the second scan signal generator 252 corresponding to the 0-th pixel row may be formed, and according to embodiments, the second scan signal GR of the first pixel row may be generated by applying only a start signal to the control terminal ACL_FLM of the second scan signal generator 252 corresponding to the pixels PXr, PXg, and PXb in the first pixel row.

Referring to FIG. 8, a structure of the third scan signal generator 203 that generates the third scan signal GI will be described.

The third scan signal generator 203, disposed at the left of the display area DA, may be electrically connected to all of the pixels PXr, PXg, and PXb in the two pixel rows. As a result, a same third scan signal GI may be applied to the pixels PXr, PXg, and PXb in the first pixel row and the pixels PXr, PXg, and PXb in the second pixel row. The third scan signal generator 203 electrically connected to the pixels PXr, PXg, and PXb in each row may all have a same circuit structure.

Each third scan signal generator 203 may include two clock input terminals In1 and In2, a control terminal ACL_FLM, and an output terminal Out. Each third scan signal generator 203 may generate the third scan signal GI using the clock signal input from the clock input terminals In1 and In2 and the start signal input from the control terminal ACL_FLM and output the third scan signal Gi through the output terminal Out.

Different clock signals GI_CLK1 and GI_CLK2 may be received from the two clock input terminals In1 and In2 of each third scan signal generator 203. In an embodiment, referring to FIG. 8, the third scan signal generator 203 electrically connected to the pixels PXr, PXg, and PXb in the first and second pixel rows may receive the second clock signal GI_CLK2 from the first clock input terminal In1 and receive the first clock signal GI_CLK1 from the second clock input terminal In2. The third scan signal generator 203 electrically connected to the pixels PXr, PXg, and PXb in the third and fourth pixel rows may receive the first clock signal GI_CLK1 from the first clock input terminal In1, and receive the second clock signal GI_CLK2 from the second clock input terminal In2.

The output terminal Out of each third scan signal generator 203 may output the third scan signal GI, and the output third scan signal GI may be transmitted to the pixels PXr, PXg, and PXb in the two pixel rows through the third scan line 153. Since the third scan signal generator 203 is disposed only on the left side of the pixel row, the pixels PXr, PXg, and PXb in the two pixel rows may receive the third scan signal GI only from a side.

The third scan signal GI output from each third scan signal generator 203 through the output terminal Out may also be input to the control terminal ACL_FLM of the third scan signal generator 203 of the next pixel row. For example, the third scan signal GI may also be used as a carry signal for the third scan signal generator 203 disposed in the next pixel row.

In order to apply the third scan signal GI to the third scan signal generator 203 connected to the pixels PXr, PXg, and PXb in the first pixel row, a third scan signal generator 203 corresponding to the 0-th pixel row may be formed, and according to embodiments, the third scan signal GI of the first pixel row may be generated by applying only a start signal to the control terminal ACL_FLM of the third scan signal generator 203 corresponding to the pixels PXr, PXg, and PXb in the first pixel row.

Referring to FIG. 9, a structure of the light emission signal generators 205 and 255 that generates the light emission signal EM will be described.

One of the first light emission signal generators 205 disposed on the left side of the display area DA may be electrically connected to all the pixels PXr, PXg, and PXb in two pixel rows, and one of the second light emission signal generators 255 disposed on the right side of the display area DA may be electrically connected to all the pixels PXr, PXg, and PXb in the two pixel rows.

Each of the first light emission signal generator 205 and each of the second light emission signal generator 255 may have a same circuit structure.

Each of the light emission signal generators 205 and 255 may include two clock input terminals In1 and In2, a control terminal ACL_FLM, and an output terminal Out. Each of the light emission signal generators 205 and 255 may generate a light emission signal EM using the clock signal input from the clock input terminals In1 and In2 and the start signal input from the control terminal ACL_FLM and output the light emission signal EM through the output terminal Out.

Different clock signals EM_CLK1 and EM_CLK2 may be received from the two clock input terminals In1 and In2 of each of the light emission signal generators 205 and 255. In an embodiment, referring to FIG. 9, the light emission signal generators 205 and 255 connected to the pixels PXr, PXg, and PXb in the first and second pixel rows may receive a second clock signal EM_CLK2 from the first clock input terminal In1 and receive a first clock signal EM_CLK1 from the second clock input terminal In2. On the other hand, the light emission signal generators 205 and 255 connected to the pixels PXr, PXg, and PXb in the third and fourth pixel rows may receive the first clock signal EM_CLK1 from the first clock input terminal In1 and receive the second clock signal EM_CLK2 from the second clock input terminal In2.

The output terminal Out of each of the light emission signal generators 205 and 255 may output the light emission signal EM, and the output light emission signal EM may be transmitted to the pixels PXr, PXg, and PXb in the two pixel rows through the light emission control line 155. Since the light emission signal generators 205 and 255 are disposed on both sides of each pixel row, the pixels PXr, PXg, and PXb in a pixel row may receive a same light emission signal EM from the light emission signal generators 205 and 255 on both sides of the each pixel row.

The light emission signal EM output from each of the light emission signal generators 205 and 255 through the output terminal Out may also be input to the control terminal ACL_FLM of the light emission signal generators 205 and 255, of the next pixel row, respectively. For example, the light emission signal EM may also be used as a carry signal for the light emission signal generators 205 and 255 disposed in the next pixel row.

In order to apply the light emission signal EM to the light emission signal generators 205 and 255 connected to the pixels PXr, PXg, and PXb in the first pixel row, light emission signal generators 205 and 255 corresponding to the 0-th pixel row may be formed, and according to embodiments, the light emission signal EM of the first pixel row may be generated by applying only a start signal to the control terminal ACL_FLM of the light emission signal generators 205 and 255 corresponding to the pixels PXr, PXg, and PXb in the first pixel row.

Unlike the embodiments shown in FIG. 5 to FIG. 9, according to embodiments, at least one of the light emission signal generators 205 and 255, the second scan signal generator 252, and the third scan signal generator 203 may output signals only to pixels PXr, PXg, and PXb in one pixel row, or may output a same signal to the pixels PXr, PXg and PXb in at least three pixel rows.

Although FIG. 6 to FIG. 9 illustrate that two clock signals EM_CLK1 and EM_CLK2 are included, the disclosure is not limited thereto, and according to embodiments, an even number of clock signals of four or more may be included.

The first scan signal generators 201 and 251, the light emission signal generators 205 and 255, the second scan signal generator 252, and the third scan signal generator 203, and the pixels PXr, PXg, and PXb may be formed in a same layer through a same process. As a result, transistors formed in the first scan signal generators 201 and 251, the light emission signal generators 205 and 255, the second scan signal generator 252, and the third scan signal generator 203 may be n-type transistors including an oxide semiconductor.

As described above, the first scan signal generators 201 and 251 may be formed for the each pixel row, and the light emission signal generators 205 and 255, the second scan signal generator 252, and the third scan signal generator 203 may be formed in common for two pixel rows. As described above, the first scan signal generators 201 and 251 and the light emission signal generators 205 and 255 may be disposed on both sides of the display area DA, and the second scan signal generator 252 and the third scan signal generator 203 may be disposed on only a side of the display area DA.

However, the arrangement and connection structure of the signal generators may be modified, and referring to FIG. 10 to FIG. 12, a structure of another embodiment will be described in detail.

Figure 10:
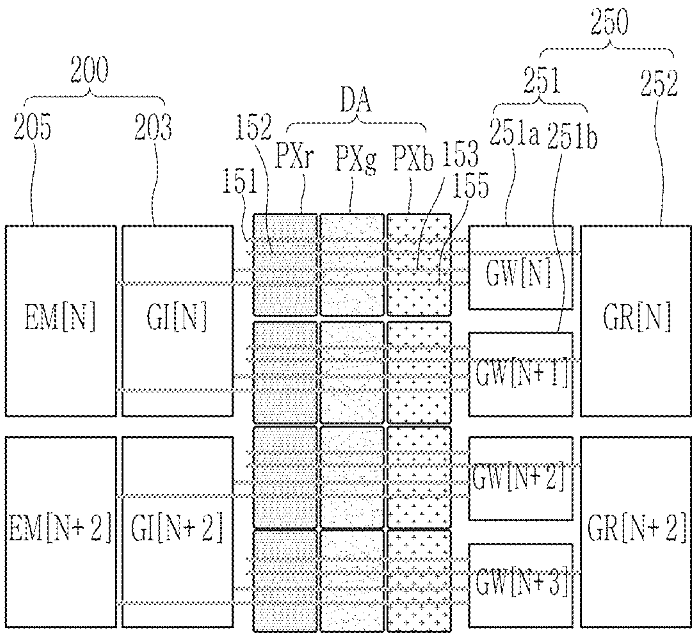
FIG. 10 is a schematic block diagram of a light emitting display device according to an embodiment.
Figure 11:
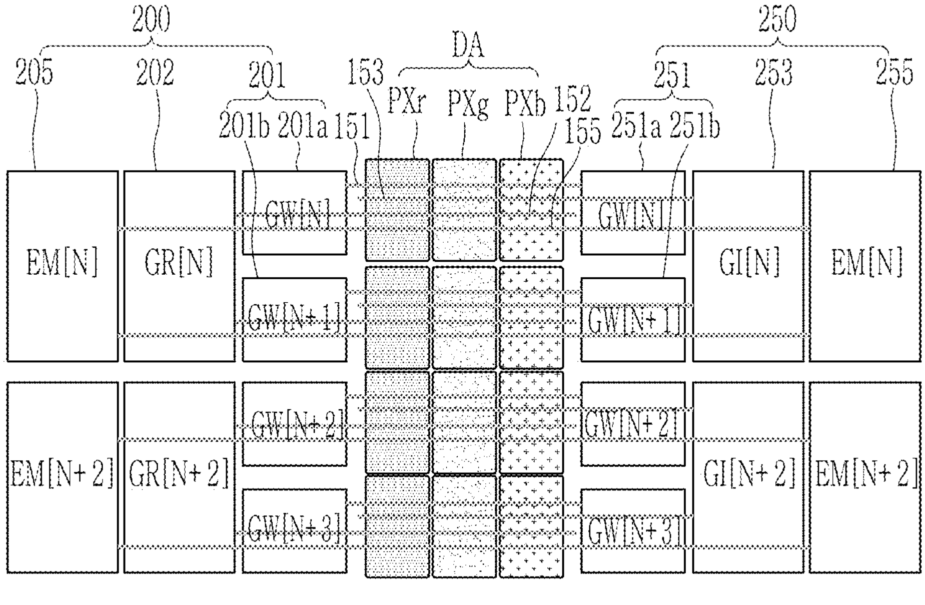
FIG. 11 is a schematic block diagram of a light emitting display device according to an embodiment.
Figure 12:
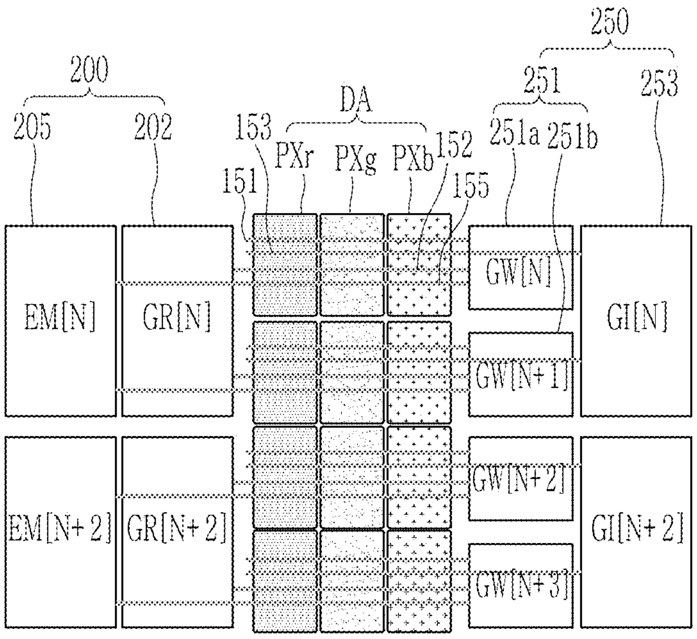
FIG. 12 is a schematic block diagram of a light emitting display device according to an embodiment.

FIG. 10 to FIG. 12 are schematic block diagrams of a light emitting display device 10 according to an embodiment.

Unlike the embodiment of FIG. 5, in an embodiment, referring to FIG. 10, a first scan signal generator and a light emission signal generator may also be disposed only on a side of a display area DA.

Among signal generators 200 and 250 disposed on both sides of the display area DA, the first signal generator 200 may include a light emission signal generator 205 that generates a light emission signal EM and a third scan signal generator 203 that generates a third scan signal GI, and the second signal generator 250 may include a second scan signal generator 252 that generates a second scan signal GR and a first scan signal generator 251 that generates a first scan signal GW.

The light emission signal generator 205, the second scan signal generator 252, and the third scan signal generator 203, which generate the light emission signal EM, the second scan signal GR, and the third scan signal GI, may apply a same signal to pixels PXr, PXg, and PXb in two pixel rows, respectively. On the contrary, the first scan signal generator 251 that generates the first scan signal GW may apply a same signal to each of the pixels PXr, PXg, and PXb in one pixel row. In the first scan signal generator 251, two first scan signal generators 251*a* and 251*b* may be formed corresponding to pixels PXr, PXg, and PXb in two pixel rows connected to the light emission signal generator 205, the third scan signal generator 203, or the second scan signal generator 252.

Therefore, in an embodiment, referring to FIG. 10, since the light emission signal generator 205 and the first scan signal generator 251 are disposed on only one side of display area DA, the light emission signal EM and the first scan signal GW may be applied only from one side of pixels PXr, PXg, and PXb. The second scan signal generator 252 and the third scan signal generator 203 may also be disposed on only one side of the display area DA, and thus the second scan signal GR and the third scan signal GI may also be applied only from one side of the pixels PXr, PXg, and PXb.

The second scan signal generator 252 and the third scan signal generator 203 in FIG. 10 are the same as those shown in FIG. 5, and thus the light emission signal generator 205 and the first scan signal generator 251 will be described hereinafter.

In an embodiment, referring to FIG. 10, since the light emission signal generator 205 and first scan signal generator 251 are disposed only on a side of the pixel PXr, PXg, and PXb, compared to the embodiment of FIG. 5, a luminance difference may occur in the pixels PXr, PXg, and PXb. However, the luminance difference may be supplemented by reducing a load of wiring within the display area DA or driving only within a range where the luminance difference does not occur, and thus even in a light emitting display device with a structure of FIG. 10, degradation of display quality may not occur, and the pixels PXr, PXg, and PXb including n-type transistors may perform an operation (e.g., a normal operation).

Compared to the embodiment of FIG. 5, in an embodiment, referring to FIG. 10, a space of the non-display area disposed on the left and right of the display area DA may be narrow, and an output transistor (also referred to as a buffer transistor) formed in each signal generator may be formed relatively large and a more stable voltage may be provided to the pixels PXr, PXg, and PXb.

Hereinafter, an embodiment of FIG. 11 will be described.

An embodiment of FIG. 11 is similar to the embodiment of FIG. 5 except that a third scan signal generator 253 is disposed on a right side of the display area DA and a second scan signal generator 202 is disposed on a left side of the display area DA.

For example, in an embodiment, referring to FIG. 11, a first signal generator 200 disposed on the left side of the display area DA may include a first light emission signal generator 205 that generates a light emission signal EM, a second scan signal generator 202 that generates a second scan signal GR, and a first-first scan signal generator 201 that generates a first scan signal GW. The second signal generator 250 disposed on the right side of the display area DA may include a second light emission signal generator 255 that generates a light emission signal EM, a third scan signal generator 253 that generates a third scan signal GI, and a first-second scan signal generator 251 that generates a first scan signal GW.

The first and second light emission signal generators 205 and 255 (referred to as light emission signal generators), the second scan signal generator 202, and the third scan signal generator 253, which generate the light emission signal EM, the second scan signal GR, and the third scan signal GI may apply a same signal to pixels PXr, PXg, and PXb in two pixel rows, respectively. On the contrary, the first scan signal generators 201 and 251 that generate the first scan signal GW may each apply a same signal to pixels PXr, PXg, and PXb in one pixel row.

In an embodiment, referring to FIG. 11, the light emission signal generators 205 and 255 and the first-first and first-second scan signal generators 201 and 251 (also referred to as first scan signal generators) may be formed in the signal generators 200 and 250 disposed on both sides of the display area DA such that a same light emission signal EM and a same first scan signal GW are applied to pixels PXr, PXg, and PXb in one pixel row from both sides of the display area DA. On the contrary, for the second scan signal GR and the third scan signal GI, the signal generator may be disposed only on a side of the display area DA. For example, in an embodiment, referring to FIG. 11, the second scan signal GR may be formed only in the first signal generator 200 disposed on the left side of the display area DA, and the third scan signal GI may be formed only in the second signal generator 250 disposed on the right side of the display area DA.

A structure of FIG. 11 and a structure of FIG. 5 may have a same merit.

Hereinafter, an embodiment of FIG. 12 will be described.

An embodiment of FIG. 12 is similar to the embodiment of FIG. 10 except that a third scan signal generator 253 is disposed on a right side of the display area DA and a second scan signal generator 202 is disposed on a left side of the display area DA.

For example, a first signal generator 200 may include a light emission signal generator 205 that generates a light emission signal EM and a second scan signal generator 202 that generates a second scan signal GR, and a second signal generator 250 may include a third scan signal generator 253 that generates a third scan signal GI and a first scan signal generator 251 that generates a first scan signal GW.

A structure of FIG. 12 and a structure of FIG. 10 may have a same merit.

The first scan signal generator 201 and 251, the second scan signal generator 202, the third scan signal generator 235, and the first light emission signal generator 205 included in embodiments of FIG. 10 to FIG. 12 and the first scan signal generator 201 and 251, the second scan signal generator 202, the third scan signal generator 235, and the first light emission signal generator 205 shown in FIG. 6 to FIG. 9 may have same structures.

The above description is an example of technical features of the disclosure, and those skilled in the art to which the disclosure pertains will be able to make various modifications and variations. Therefore, the embodiments of the disclosure described above may be implemented separately or in combination with each other.

Therefore, the embodiments disclosed in the disclosure are not intended to limit the technical spirit of the disclosure, but to describe the technical spirit of the disclosure, and the scope of the technical spirit of the disclosure is not limited by these embodiments. The protection scope of the disclosure should be interpreted by the following claims, and it should be interpreted that all technical spirits within the equivalent scope are included in the scope of the disclosure.

What is claimed is:

1. A light emitting display device comprising:

a plurality of pixels arranged in a plurality of pixel rows;

a first scan signal generator that provides a first scan signal to the plurality of pixels in the plurality of pixel rows;

a second scan signal generator that provides a second scan signal to the plurality of pixels in the plurality of pixel rows;
a third scan signal generator that provides a third scan signal to the plurality of pixels in the plurality of pixel rows; and
a light emission signal generator that provides a light emission signal to the plurality of pixels in the plurality of pixel rows, wherein
each of the plurality of pixels comprises:
a driving transistor;
a light emitting diode that receives an output from the driving transistor;
a second transistor that receives the first scan signal through a gate electrode of the second transistor;
a third transistor that receives the second scan signal through a gate electrode of the third transistor;
a fourth transistor that receives the third scan signal through a gate electrode of the fourth transistor; and
a fifth transistor that receives the light emission signal through a gate electrode of the fifth transistor,
each of the plurality of pixels includes a pixel circuit consisting of the driving transistor, the second transistor, the third transistor, the fourth transistor, the fifth transistor, the light emitting diode, and at least one capacitor,
each of the second scan signal generator, the third scan signal generator, and the light emission signal generator provides a same signal to the plurality of pixels in two of the plurality of pixel rows,
the light emission signal generator comprises a first light emission signal generator and a second light emission signal generator,
the first light emission signal generator and the second light emission signal generator are disposed on opposing sides of the plurality of pixels,
the second light emission signal generator provides a same light emission signal as the first light emission signal generator to the plurality of pixels in any one of the plurality of pixel rows, and
during one frame period, the first scan signal is turned-off while the third scan signal is turned-on, and the first scan signal is turned-on after a predetermined time has elapsed after the third scan signal is turned-off.

2. The light emitting display device of claim 1, wherein the first scan signal generator provides a same first scan signal to the plurality of pixels in each of the plurality of pixel rows.

3. The light emitting display device of claim 2, wherein
the first scan signal generator comprises a first-first scan signal generator and a first-second scan signal generator, and
the first-first scan signal generator and the first-second scan signal generator are disposed on opposing sides of the plurality of pixels.

4. The light emitting display device of claim 2, wherein each of the second scan signal generator and the third scan signal generator is disposed on only a side of the plurality of pixels.

5. The light emitting display device of claim 4, wherein
the second scan signal generator is disposed on a first side of the plurality of pixels, and
the third scan signal generator is disposed on a second side of the plurality of pixels, which faces the first side.

6. The light emitting display device of claim 2, wherein the first scan signal generator is disposed on only a side of the plurality of pixels.

7. The light emitting display device of claim 6, wherein the first scan signal generator is disposed on a first side of the plurality of pixels.

8. The light emitting display device of claim 6, wherein each of the second scan signal generator and the third scan signal generator is disposed on only a side of the plurality of pixels.

9. The light emitting display device of claim 8, wherein
the second scan signal generator is disposed on a first side of the plurality of pixels, and
the third scan signal generator is disposed on a second side of the plurality of pixels, which faces the first side.

10. The light emitting display device of claim 1, wherein each of the driving transistor, the second transistor, the third transistor, the fourth transistor, and the fifth transistor are n-type transistors that include an oxide semiconductor layer, and
each of the pixel circuit consists of two capacitors.

11. The light emitting display device of claim 10, wherein
a first electrode of the second transistor is electrically connected to a data line,
a second electrode of the second transistor is electrically connected to a gate electrode of the driving transistor,
a first electrode of the third transistor is electrically connected to a reference voltage line,
a second electrode of the third transistor is electrically connected to the gate electrode of the driving transistor,
a first electrode of the fourth transistor is electrically connected to an initialization voltage line,
a second electrode of the fourth transistor is electrically connected to a second electrode of the driving transistor and an electrode of the light emitting diode,
a first electrode of the fifth transistor is electrically connected to a driving voltage line, and
a second electrode of the fifth transistor is electrically connected to a first electrode of the driving transistor.

12. The light emitting display device of claim 11, wherein
the two capacitors comprise a first capacitor and a second capacitor,
a first electrode of the first capacitor is electrically connected to the second electrode of the driving transistor and the electrode of the light emitting diode,
a second electrode of the first capacitor is electrically connected to the gate electrode of the driving transistor,
a first electrode of the second capacitor is electrically connected to the driving voltage line, and
a second electrode of the second capacitor is electrically connected to the second electrode of the driving transistor and the electrode of the light emitting diode.

13. A light emitting display device comprising:
a plurality of pixels arranged in a plurality of pixel rows;
a first scan signal generator that provides a first scan signal to the plurality of pixels in the plurality of pixel rows;
a second scan signal generator that provides a second scan signal to the plurality of pixels in the plurality of pixel rows;
a third scan signal generator that provides a third scan signal to the plurality of pixels in the plurality of pixel rows; and
a light emission signal generator that provides a light emission signal to the plurality of pixels in the plurality of pixel rows, wherein
each of the plurality of pixels comprises:
a driving transistor;
a light emitting diode that receives an output from the driving transistor;

a second transistor that receives the first scan signal through a gate electrode of the second transistor;

a third transistor that receives the second scan signal through a gate electrode of the third transistor;

a fourth transistor that receives the third scan signal through a gate electrode of the fourth transistor; and a fifth transistor that receives the light emission signal through a gate electrode of the fifth transistor, each of the plurality of pixels includes a pixel circuit consisting of the driving transistor, the second transistor, the third transistor, the fourth transistor, the fifth transistor, the light emitting diode, and at least one capacitor, the light emission signal generator comprises a first light emission signal generator and a second light emission signal generator that each apply a same light emission signal to the plurality of pixels in each of the plurality of pixel rows, the first light emission signal generator and the second light emission signal generator are disposed on opposing sides of the plurality of pixels, the first scan signal generator comprises a first-first scan signal generator and a first-second scan signal generator, the first-first scan signal generator and the first-second scan signal generator are disposed on opposing sides of the plurality of pixels, each of the second scan signal generator and the third scan signal generator is disposed on only a side of the plurality of pixels, and during one frame period, the first scan signal is turned-off while the third scan signal is turned-on, and is turned-on after a predetermined time has elapsed after the third scan signal is turned-off.

14. The light emitting display device of claim 13, wherein the second scan signal generator is disposed on a first side of the plurality of pixels, and the third scan signal generator is disposed on a second side of the plurality of pixels, which faces the first side.

15. The light emitting display device of claim 13, wherein each of the second scan signal generator, the third scan signal generator, and the light emission signal generator provides a same signal to the plurality of pixels in two of the plurality of pixel rows.

16. The light emitting display device of claim 15, wherein the first scan signal generator provides a same first scan signal to the plurality of pixels in each of the plurality of pixel rows.

17. The light emitting display device of claim 13, wherein each of the driving transistor, the second transistor, the third transistor, the fourth transistor and the fifth transistor are n-type transistors that include an oxide semiconductor layer, and each of the pixel circuit consists of two capacitors.

18. The light emitting display device of claim 17, wherein a first electrode of the second transistor is electrically connected to a data line, a second electrode of the second transistor is electrically connected to a gate electrode of the driving transistor, a first electrode of the third transistor is electrically connected to a reference voltage line, a second electrode of the third transistor is electrically connected to the gate electrode of the driving transistor, a first electrode of the fourth transistor is electrically connected to an initialization voltage line, a second electrode of the fourth transistor is electrically connected to a second electrode of the driving transistor and an electrode of the light emitting diode, a first electrode of the fifth transistor is electrically connected to a driving voltage line, and a second electrode of the fifth transistor is electrically connected to a first electrode of the driving transistor.

19. The light emitting display device of claim 18, wherein the two capacitors comprise a first capacitor and a second capacitor, a first electrode of the first capacitor is electrically connected to the second electrode of the driving transistor and the electrode of the light emitting diode, a second electrode of the first capacitor is electrically connected to the gate electrode of the driving transistor, a first electrode of the second capacitor is electrically connected to the driving voltage line, and a second electrode of the second capacitor is electrically connected to the second electrode of the driving transistor and the electrode of the light emitting diode.

* * * * *